Nov. 1, 1966 J. D. SHUSTER 3,282,568
COMBINED ELECTRICAL SIGNALS FOR CONSTANT
DEPTH TOWED SUBMERGED BARGES
Filed Oct. 12, 1964 2 Sheets-Sheet 1

INVENTOR
JOHN D. SHUSTER
BY John J. Byrne
ATTORNEY

INVENTOR
JOHN D. SHUSTER

United States Patent Office 3,282,568
Patented Nov. 1, 1966

3,282,568
COMBINED ELECTRICAL SIGNALS FOR CONSTANT DEPTH TOWED SUBMERGED BARGES
John Davis Shuster, Braintree, Mass., assignor to The Continental Oil Company, Ponca City, Okla., a corporation of Delaware
Filed Oct. 12, 1964. Ser. No. 403,166
3 Claims. (Cl. 254—173)

This invention relates generally to methods and structure for utilizing the electrical signals received from instruments in a towed, submersible barge by a winch assembly for controlling the depth of the barge to maintain the barge at a selected depth.

The art of transporting petroleum and other liquid products via the seas has become of major significance in recent years. Many problems are involved in such underwater transportation as described in the assignee's co-pending application S.N. 403,165, filed together herewith in the name of Harold E. Van der Linde. As pointed out therein, one of the critical problems, due to considerations of safety and economy is controlling the depth of the submerged vessel. It is the primary objective of this invention to provide a control at the towing winch to receive intelligence concerning the depth of the submerged vessel together with means to correct any deviations from desired depth by hauling-in or paying-out the towing cable.

A further objective of the invention is to provide electrical controls which will sense the salinity, temperature, and angle of trim of any stabilizers on the towed vehicle, and transmit this intelligence so that anticipatory corrections may be made prior to any depth variation detected by the depth sensor.

A still further objective of this invention is to provide means whereby the anticipatory correction circuitry will be under the control of time delay relays to thereby limit the time in which these anticipatory signals will be effective and thus cause the depth sensor of the apparatus to have final control.

These and other objectives and advantages of the invention will become more apparent upon a reading of the following description of one system made in accordance with the invention as diagrammatically illustrated by way of example in the drawings, in which.

Figure 1:
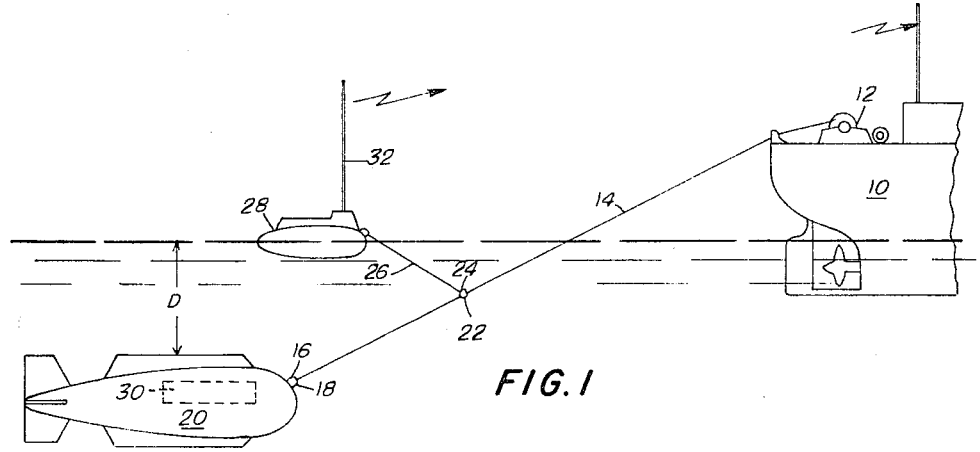
FIGURE 1 is a diagrammatical sketch of the environment in which the subject invention finds itself.

Referring now more particularly to the drawings wherein like numerals indicate like elements, the numeral 10 indicates a towing vessel having a winch assembly 12 mounted thereon. Extending from the winch is a cable 14 having its free end 16 secured to a mounting 18 of a submersible barge 20.

At point 22 intermediate the length of cable 14 is an attachment collar 24, to which a cable 26 is secured. The cable 26 is secured to a surface buoy 28 and is of a length to maintain the buoy in a position overlying the barge.

The barge 20 is provided with an instrument housing 30 having a plurality of sensor elements secured therein. The sensor elements will be described with more particularity hereinafter. The intelligence derived from these sensor instruments are electrically communicated to the vessel 10 either by cable 14, or to the buoy 30, via cable 26, and that portion of 14 between mounting 18 and the juncture point 22. If the latter route is chosen, the intelligence is relayed by surface-to-surface radio by transceiver equipment 32 on buoy 28. This intelligence is used at the winch 12 to either haul-in or pay-out the cable 14 to maintain the depth "D" constant.

Figure 2:
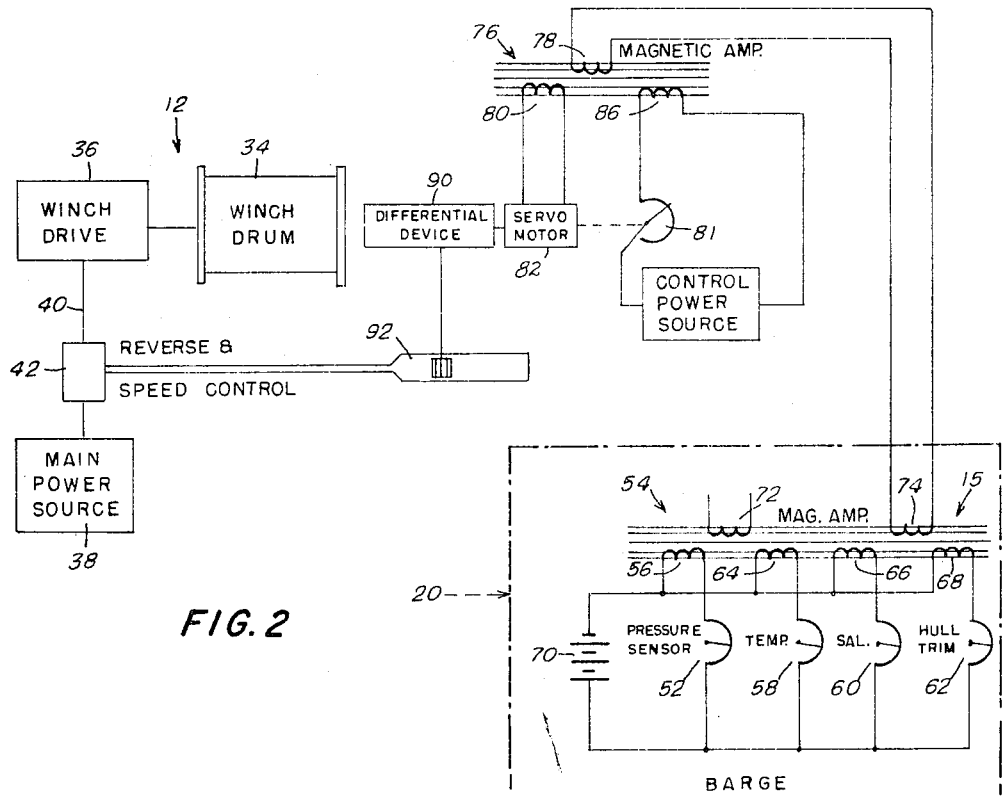
FIGURE 2 is a representative schematic-diagrammatic view of the invention.

Winch assembly 12 includes a winch drum 34 (FIGURE 2) driven by an electrical or steam winch drive 36. The main power source 38 for the winch drive (when electrically driven is connected thereto by an electrical conduit 40. Across the electrical conduit 40 is a reverse and speed control 42 of standard design. The control 42 must have the capability of selecting the direction of rotational output for the winch drive motor 36 and the speed of this rotational output.

Mounted on the submerged vessel 20 is a suitable rheostat-type depth sensing device 52 having an output coupled to a magnetic amplifier 54 via coupling coil 56. In addition a temperature sensor 58, a salinity sensor 60, and a trim sensor 62 are coupled to the amplifier 54. These last-mentioned instruments are respectively provided with coils 64, 66, and 68 for coupling their measured outputs to magnetic amplifier 54. A battery power source 70 impresses a voltage across the sensor and a reference voltage is coupled to the amplifier via coil 72. The output 74 from this magnetic amplifier 54 is in turn coupled to a magnetic amplifier 76 on the towing vessel by a coupling coil 78. An output 80, taken from the magnetic amplifier 76 is electrically connected to a servo motor 82. The servo motor 82 in turn drives the arm of a rheostat 81 that impresses a control power source across magnetic amplifier 76 via the coil 86. The output of servo motor 82 is also applied to a differential control device 90 having an output for moving the mechanical control 92 to adjust the directional and speed control unit 42.

In other words, the effect of coil 78 will be balanced out, added to, or completely reversed by coil 86, the latter being fed from a towing vessel source and controlled in magnitude by the rheostat 81 driven by a winch control servo motor which itself is driven by the output of the third coil 80. The coil 86, therefore, gives a follow-up or closed system control.

An alternate method of accomplishing this combining of signals for tow winch control would be to use only one magnetic amplifier 100, located on the towing vessel. With this method the voltage signals from the depth, temperature, salinity and tirm sensors are individually transmitted to the towing vessel and then applied to the four control coils, 102, 104, 106 and 108 of the magnetic amplifier 100. The magnetic amplifier will also have a variable reference voltage coil 110 and an output coil 112 for the servo motor as described for the embodiment of FIGURE 1.

Figure 3:
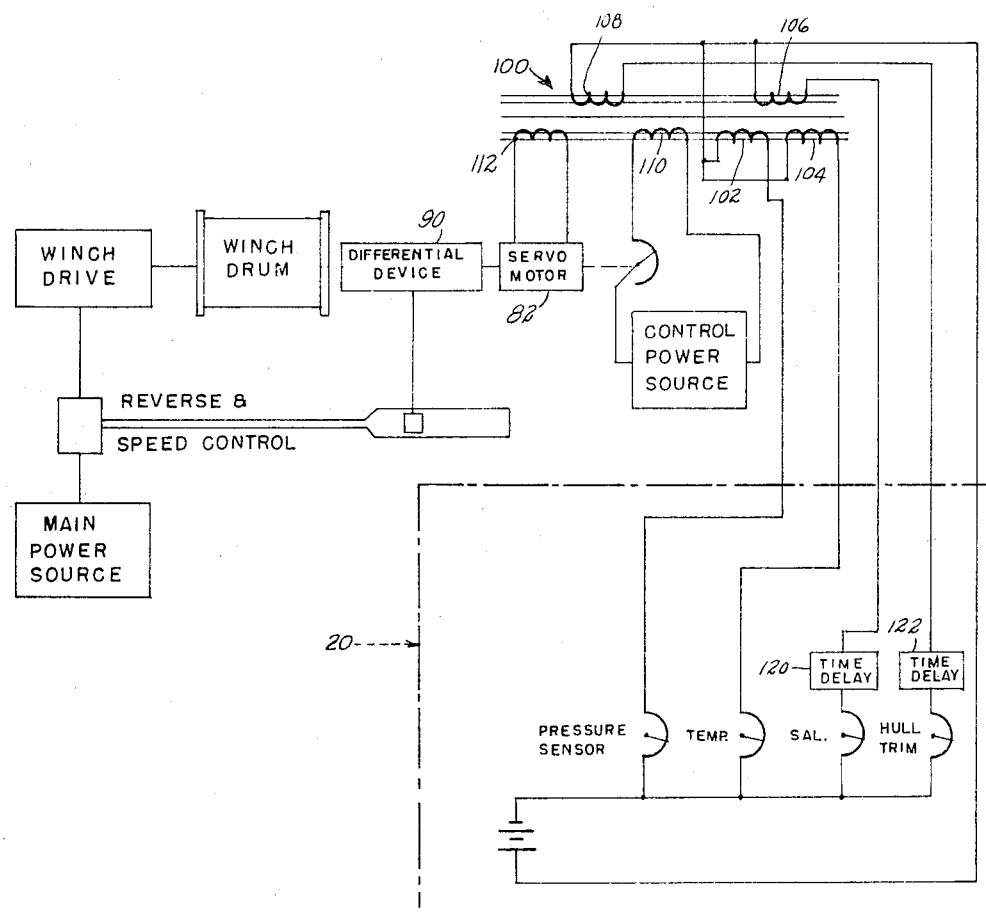
FIGURE 3 is a variation of the invention disclosed in FIGURES 1 and 2.

FIGURE 3 also discloses the placement of a pair of time delay relays 120 and 122 across the output lines of the temperature and salinity measuring instruments. The relays limit the time over which these anticipatory signals are effective permitting the actual depth sensor to be the final control.

As many embodiments may be made of this inventive concept, and as many modifications may be made in the embodiment herein shown and described, it is to be understood that all matter herein is to be interpreted merely as illustrative and not in a limiting sense.

I claim:

1. A system for controlling pay-out and haul-in of cable of a winch assembly mounted on a towing vessel and connected to a towed submersed barge comprising a reversible drive motor to drive said winch in either direction, a main power source, an electrical conduit connecting source to said motor, a direction and speed control across said conduit, a depth sensor on said barge having an electrical output proportional to barge depth, means for detecting salinity and temperature mounted on said barge, each of said means having an electrical output indicative of the salinity and temperature of the surrounding water respectively, means for combining the output from said depth sensor and said means for detecting salinity and said means for detecting said temperature to produce a combined output, means causing said motor to drive said winch in response to said combined output and said means including a magnetic amplifier to couple said output to said drive motor.

2. A system for controlling pay-out and haul-in of cable of a winch assembly mounted on a towing vessel and connected to a towed submersed barge comprising a reversible drive motor to drive said winch in either direction to thereby lower or raise said barge in proportion to cable length,
- a main power source,
- an electrical conduit connecting said source to said motor,
- a direction and speed control across said conduit,
- second instruments for detecting salinity and temperature mounted on said barge, said instruments having outputs responsive to the detected salinity and temperature respectively,
- a depth sensor on said barge having an output proportional to barge depth,
- means for transmitting the outputs from said salinity detecting instrument, temperature detecting instrument and depth sensor to said vessel,
- a magnetic amplifier on said vessel coupling said output to said drive motor.

3. The system described in claim 2 wherein time delays are placed across said second outputs.

References Cited by the Examiner
UNITED STATES PATENTS 3,088,710   5/1963   Evans _____ 254—172

SAMUEL F. COLEMAN, *Primary Examiner.*